United States Patent
Gupta et al.

(10) Patent No.: US 11,760,920 B1
(45) Date of Patent: Sep. 19, 2023

(54) LUBRICANT FOR MONOVALENT AND DIVALENT BRINES

(71) Applicant: Halliburton Energy Services, Inc., Houston, TX (US)

(72) Inventors: Nivika Rajendra Gupta, Pune (IN); Sharad Bhimrao Gotmukle, Pune (IN); Sudarshana Mukherjee, Pune (IN); Jay Deville, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/714,509

(22) Filed: Apr. 6, 2022

(51) Int. Cl.
*C09K 8/584* (2006.01)
*C09K 23/34* (2022.01)

(52) U.S. Cl.
CPC .............. *C09K 8/584* (2013.01); *C09K 23/34* (2022.01); *C09K 2208/34* (2013.01)

(58) Field of Classification Search
None
See application file for complete search history.

(56) References Cited

U.S. PATENT DOCUMENTS

| | | | |
|---|---|---|---|
| 6,750,180 B1 | 6/2004 | Argillier et al. | |
| 8,071,510 B2 | 12/2011 | Scoggins et al. | |
| 10,240,112 B2* | 3/2019 | Baseeth | C09K 8/035 |
| 10,384,178 B2* | 8/2019 | Baseeth | A61K 8/365 |
| 10,662,363 B2 | 5/2020 | Al-Yami et al. | |
| 2008/0217064 A1 | 9/2008 | Stoian et al. | |
| 2009/0057617 A1 | 3/2009 | Einweber et al. | |
| 2010/0298176 A1 | 11/2010 | Maker et al. | |
| 2012/0202726 A1 | 8/2012 | Barton et al. | |
| 2014/0005079 A1 | 1/2014 | Dahanayake et al. | |
| 2015/0007995 A1 | 1/2015 | Livescu et al. | |
| 2016/0002522 A1* | 1/2016 | Gaertner | C09K 8/04 |
| | | | 507/128 |
| 2017/0191008 A1* | 7/2017 | Baseeth | C09K 8/40 |
| 2021/0179910 A1 | 6/2021 | Ghosh et al. | |

FOREIGN PATENT DOCUMENTS

| | | |
|---|---|---|
| EP | 0713909 B1 | 5/1996 |
| EP | 3567091 A1 | 11/2019 |
| WO | 2017/176244 A1 | 10/2017 |

OTHER PUBLICATIONS

Office Action dated Mar. 14, 2023 (19 pages), U.S. Appl. No. 17/751,831, filed May 24, 2022.
Foreign Communication from Related Application—International Search Report and Written Opinion of the International Searching Authority, International Application No. PCT/US2022/023817, dated Jan. 4, 2023, 11 pages.
Filing Receipt, Specification and Drawings for U.S. Appl. No. 17/751,831, filed May 24, 2022, entitled "Methods of Making and Using a Lubricant Composition" 48 pages.

* cited by examiner

*Primary Examiner* — John J Figueroa
(74) *Attorney, Agent, or Firm* — Conley Rose, P.C.; Rodney B. Carroll

(57) ABSTRACT

Methods and compositions for using lubricants in subterranean formations, and specifically lubricants that comprise certain oils, surfactants and solvents, and methods for their use, are provided. In one embodiment, the methods include introducing a treatment fluid that includes a base fluid and a lubricant including at least one vegetable oil, at least one nonionic surfactant, and at least one cosolvent into at least a portion of a subterranean formation.

24 Claims, 3 Drawing Sheets

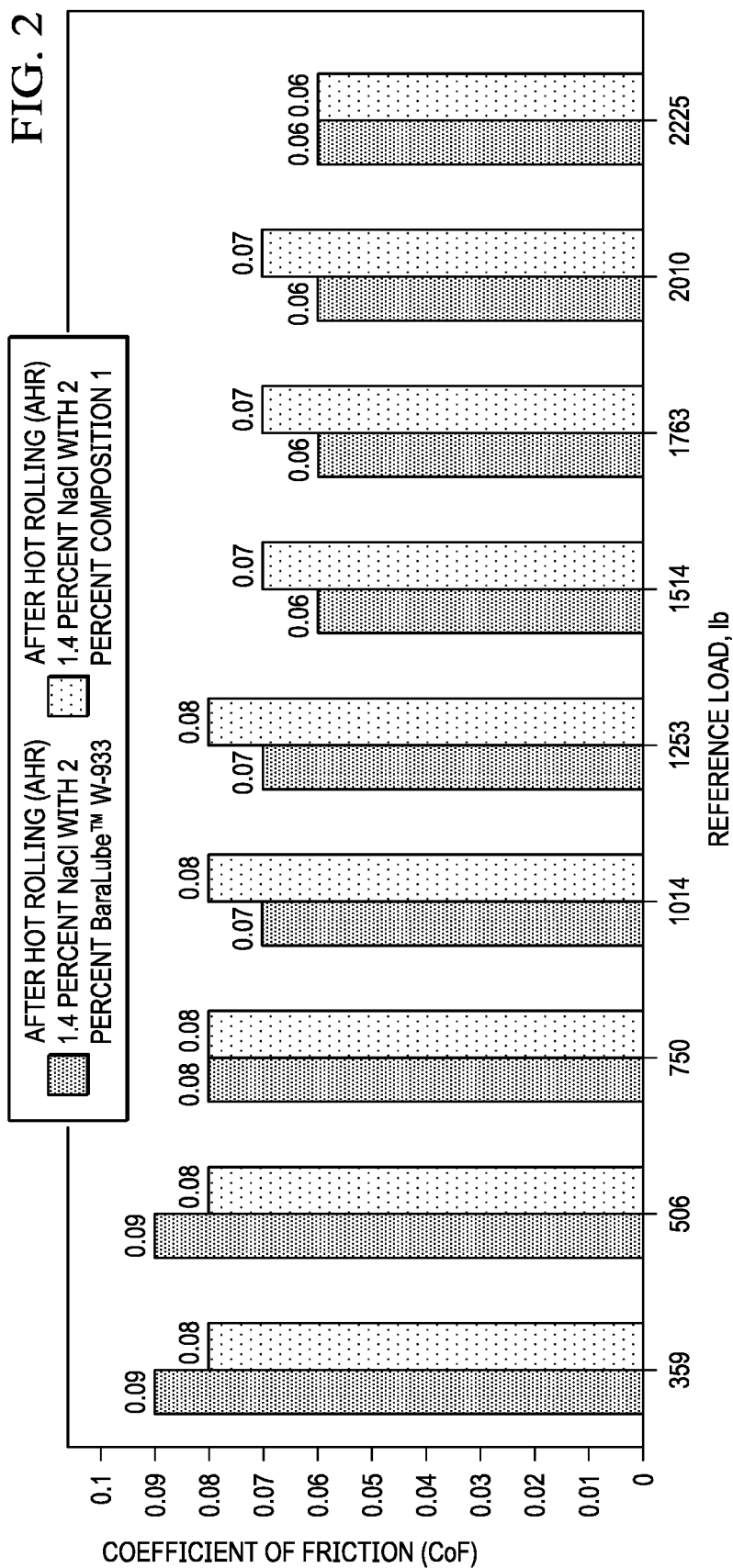

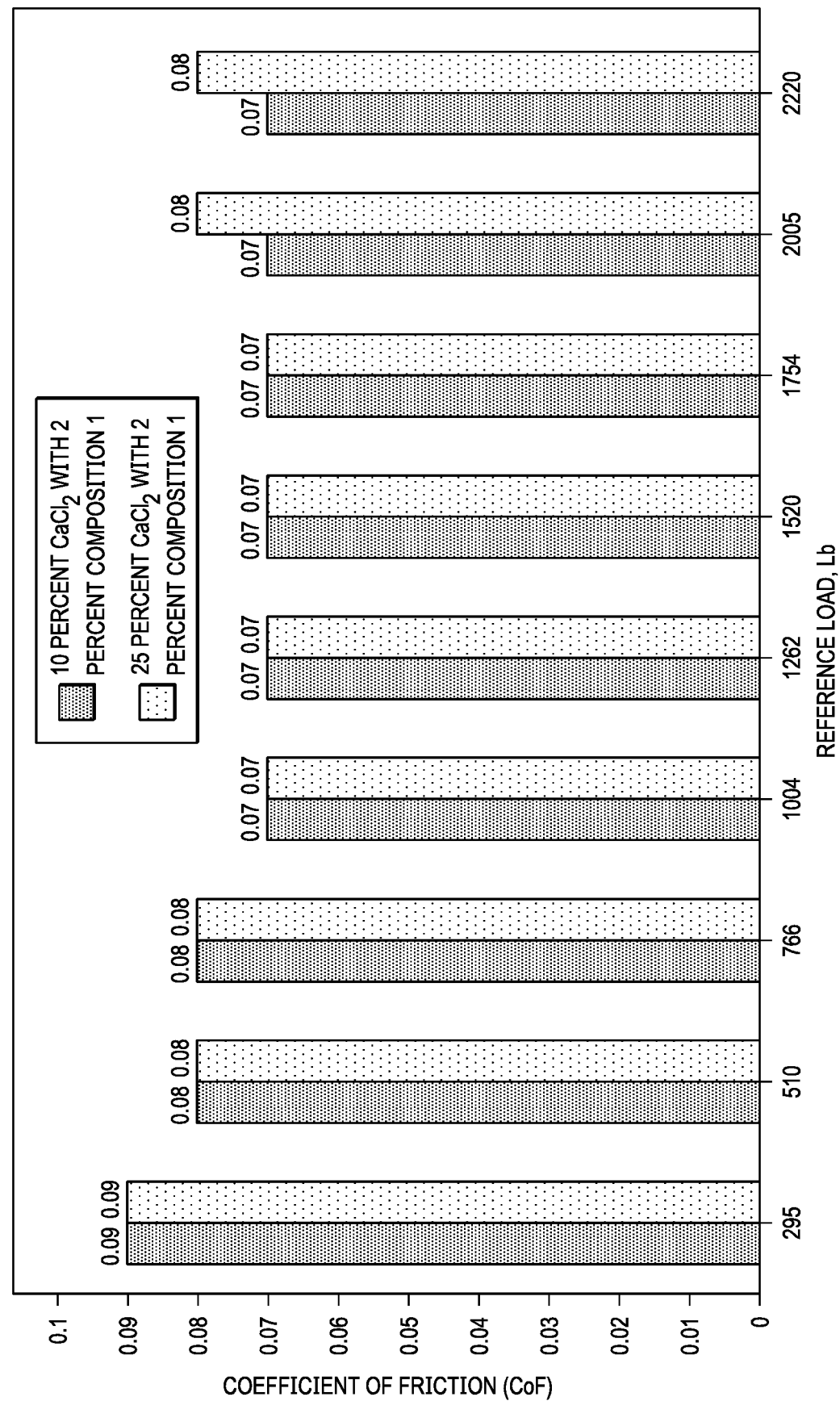

LUBRICANT FOR MONOVALENT AND DIVALENT BRINES

BACKGROUND

The present disclosure relates to methods and compositions for using certain lubricants in subterranean formations.

Treatment fluids often contain additives to impart desired physical and/or chemical characteristics to the fluid. Such additives may include lubricants, and treatment fluids that include lubricants may be used in a variety of subterranean treatments and oilfield operations.

For example, drilling fluids or muds are commonly circulated in the well during such drilling to cool and lubricate the drilling apparatus, lift cuttings out of the wellbore, and counterbalance the subterranean formation pressure encountered. An important function of drilling fluid is to reduce the considerable torque on the rotating drill stem caused by the friction between the outside of the drill pipe comprising the drill stem and the wall of the well and/or casing strings. Drilling through offsets and highly deviated or horizontal wells results in increased frictional forces, increasing the demand on the lubricating properties of the drilling fluids. If the lubricating properties of the drilling fluids are not sufficient and the drill pipe encounters excessive torque, drilling may be interrupted by costly delays. Increased lubricity is also often required during wellbore cleanup, coil tubing operations, wireline operations, and the running of production tubulars.

In most rotary drilling procedures, the drilling fluid takes the form of a "mud", which may be a liquid having solids suspended therein. The solids function to impart desired rheological properties to the drilling fluid and also to increase the density thereof in order to provide a suitable hydrostatic pressure at the bottom of the well. After a well has been drilled, the drilling mud is generally replaced with a completion fluid, which is typically a solids-free or acid soluble, non-damaging formulation, selected to minimize reductions in permeability of the producing zone. The density of the completion fluid is generally chosen and controlled to ensure that the hydrostatic head or pressure of the fluid in the wellbore matches the hydrostatic pressure of the column of drilling fluid being displaced.

For several decades, brines have been utilized for well drilling and completions. High density brines have been found to have particular applicability for use in deep wells. Exemplary high density brines include sodium chloride, potassium chloride, calcium chloride, sodium bromide, calcium bromide, zinc bromide, sodium formate, potassium formate, and cesium formate brines. While high density brines have been found sufficient in providing the lubricity and viscosity of a wellbore treatment fluid under extreme shear, pressure and temperature variances, such brines may prove ineffective if unable to exhibit the constant lubricity required during high shear conditions.

Various components or additives for use as lubricants in water-based drilling fluids as well as completion fluids are known. However, many of the known additives are not compatible with brines, or with drilling fluids or completion fluids containing brine as a major component. For example, ester cleavage of carboxylic acid ester additives often results in the creation of components with a substantial tendency to foam, which introduces undesirable side effects into the fluid systems. Similarly, sulfonates of vegetable oils, which have also been used as lubricants in water-based systems, also generally show undesirably substantial foaming. Furthermore, conventional additives used as lubricating agents in drilling fluids and/or completion fluids may present environmental concerns, and may not be economical in some applications. For example, stricter regulations with regard to biodegradability of drilling fluids and their constituents are reducing the use of otherwise suitable mineral oils.

BRIEF DESCRIPTION OF THE DRAWINGS

These drawings illustrate certain aspects of some of the embodiments of the present disclosure and should not be used to limit or define the claims.

FIG. 2 is a plot illustrating the coefficient of friction (CoF) of various reference loads for a lubricant in sodium chloride (NaCl) compared to a commercially available lubricant in sodium chloride (NaCl), in accordance with certain embodiments of the present disclosure; and FIG. 3 is a plot illustrating the coefficient of friction (CoF) for various reference loads for a lubricant in 10% calcium chloride ($CaCl_2$) and 25% calcium chloride ($CaCl_2$), in accordance with certain embodiments of the present disclosure.

Figure 1:
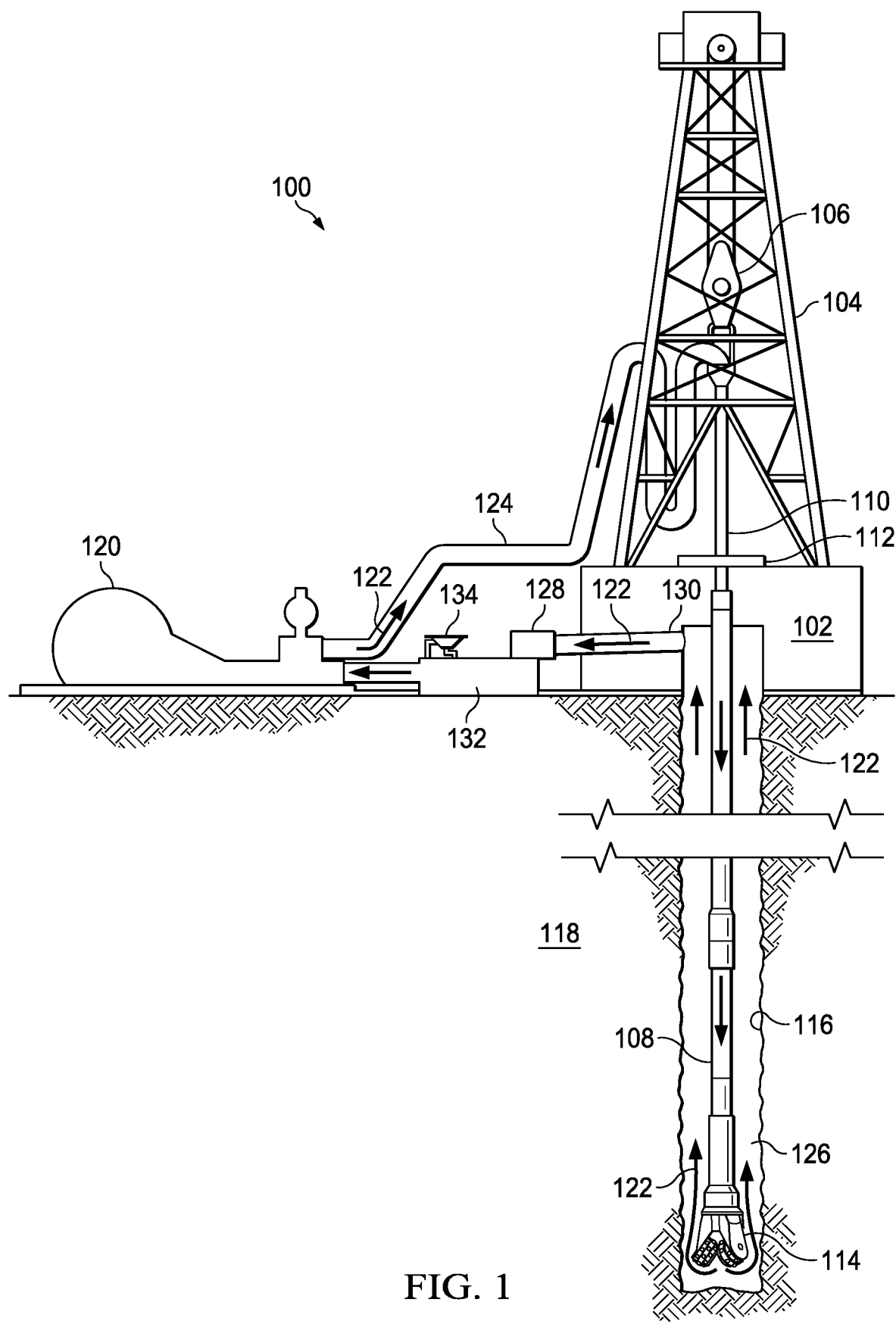
FIG. 1 is a schematic diagram of a wellbore drilling assembly used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods and compositions for using certain lubricants in subterranean formations, and specifically to lubricants that comprise certain oils, surfactants and solvents, and methods for use.

More specifically, the present disclosure provides a method for introducing a treatment fluid including a base fluid and a lubricant that includes at least one vegetable oil, at least one nonionic surfactant, and at least one cosolvent into at least a portion of a subterranean formation. In some embodiments, the present disclosure provides a composition including a lubricant including at least one vegetable oil, at least one nonionic surfactant, and at least one cosolvent. In certain embodiments, the present disclosure provides methods for introducing a treatment fluid including a divalent brine and a lubricant that includes at least one vegetable oil, at least one nonionic surfactant, and at least one cosolvent into at least a portion of a subterranean formation; and using the treatment fluid to drill at least a portion of a well bore penetrating at least a portion of the subterranean formation;

wherein a coefficient of friction of the treatment fluid is lower than a fluid having the same composition as the treatment fluid but does not include the lubricant.

When incorporated into wellbore or completion fluids, lubricants may be effective at lowering torque and drag, and prevent sticking of downhole tubulars. In addition to enhancing lubricity, lubricants may be compatible with a variety of wellbore fluids, and/or environmentally friendly.

Among the many potential advantages to the methods and compositions of the present disclosure, only some of which are alluded to herein, certain embodiments of the methods and compositions of the present disclosure may, among other benefits, provide a lubricant that has improved stability as compared to certain other lubricants. In certain embodiments, the stable lubricant of the present disclosure may provide for improved compatibility with and/or solubility in brine fluids, in particular divalent brines, as compared to certain other lubricants, which may, for example, produce undesirable foaming and/or agglomeration. In certain embodiments, the lubricant of the present disclosure may provide for improved stability at high temperatures, with maintenance of lubricity at least up to 300° F. (148.9° C.). In some embodiments, the lubricant of the present disclosure may be less harmful to the environment as compared to certain other lubricants, at least in part due to the absence of synthetic oil and/or surfactants. In certain embodiments, the lubricant of the present disclosure may provide for maintenance of lubricity at higher loads at least up to 2500 lbs as compared to certain other lubricants.

During the operation of deep wells, a wellbore treatment fluid may exhibit enhanced lubricity. Increased lubricity is often desirable during wellbore cleanup, coil tubing operations, wireline operations, and the running of production tubulars. In some embodiments, the lubricant of the present disclosure may reduce the coefficient of friction (CoF) due to the presence of fine solids and salts in drilling fluids, particularly in water-based drilling fluids. Although the present disclosure may describe drilling, drilling fluids, and drilling muds based on such drilling fluids, it should be understood that modification according to the present disclosure of other fluids used for any subterranean operation (including but not limited to drill-in, completions, workover, and stimulation operations), to include a lubricant of the present disclosure is intended to be within the scope of the present disclosure and claims. Similarly, although the present disclosure may describe water-based drilling fluids and drilling muds based thereon, it should be understood that modification according to the present disclosure of other types of fluids, such as, for example, invert emulsions, is intended to be within the scope of the present disclosure and claims.

Treatment fluids can be used in a variety of above ground and subterranean treatment operations. As used herein, the terms "treat," "treatment," "treating," and grammatical equivalents thereof refer to any above ground or subterranean operation that uses a fluid in conjunction with achieving a desired function and/or for a desired purpose. Use of these terms does not imply any particular action by the treatment fluid. Illustrative treatment operations can include, for example, surface facilities operations, fracturing operations, gravel packing operations, acidizing operations, scale dissolution and removal, consolidation operations, and the like.

In certain embodiments, a treatment fluid including a base fluid and a lubricant may be provided. Depending on the type of treatment to be performed, the treatment fluid may include any treatment fluid known in the art. Treatment fluids that may be useful in accordance with the present disclosure include, but are not limited to, wellbore fluids, drilling fluids, cement fluids, lost circulation fluids, stimulation fluids (e.g., a fracturing fluids or an acid stimulation fluids), completion fluids, conformance fluids (e.g., water or gas shutoff fluids), sand control fluids (e.g., formation or proppant consolidating fluids), workover fluids, and/or any combination thereof.

The lubricant of the present disclosure may include at least one vegetable oil, at least one surfactant and at least one cosolvent. In some embodiments, the vegetable oil may include at least one fatty acid. The vegetable oil may be a naturally occurring vegetable oil, a genetically modified vegetable oil, or a combination thereof. In some embodiments, the vegetable oil may include at least one of sunflower oil, safflower oil, corn oil, soybean oil, rapeseed oil, meadowfoam oil, lesquerella oil, castor oil, borage oil, evening primrose oil, coconut oil, palm oil, palm kernel oil, canola oil, linseed oil, rice oil, peanut oil, cottonseed oil and olive oil, or any combination thereof. In certain embodiments, the vegetable oil may include at least one fatty acid that includes from about 6 to about 22 carbon atoms. In some embodiments, the vegetable oil may include at least one of ricinoleic acid, oleic acid, linoleic acid, linolenic acid, stearic acid, palmitic acid, dihydroxystearic acid, octanoic acid, nonaoic acid, decanoic acid, lauric acid, myristic acid, and tricanoic acid, or any combination thereof. In certain embodiments, various other fatty acids and/or impurities may be present in the vegetable oil, as long as they do not unacceptably affect the lubricating effectiveness of the lubricant.

In some embodiments, the lubricant of the present disclosure may include from about 30 wt % to about 90 wt %, from about 40 wt % to about 90 wt %, from about 30 wt % to about 80 wt %, from about 40 wt % to about 80 wt %, from about 50 wt % to about 80 wt %, from about 30 wt % to about 50 wt %, or from about 40 wt % to about 70 wt % of the vegetable oil. In some embodiments, the lubricant may include greater than or equal to about 30, 35, 40, 45, 50, 55, 60, 65, 70, 75, 80, 85, or 90 weight percent of the vegetable oil. In certain embodiments, the lubricant may include about 70 wt % vegetable oil. In certain embodiments, the lubricant may include about 40 wt % vegetable oil.

In certain embodiments, the lubricant may include soybean oil. Soybean oil may be a vegetable oil extracted from the seeds of the soybean (*Glycine max*). Soybean oil may include a variety of fatty acid esters in varying amounts depending on the soybean oil seed composition from which it is obtained and the method of obtaining the soybean oil. Fatty acid esters naturally occurring in soybean oil may include at least one of α-linolenic acid, linoleic acid, oleic acid, stearic acid, palmitic acid, or any combination thereof. A suitable soybean oil may include only one, or any combination of two or more of the aforementioned fatty acid esters. In certain embodiments, various other fatty acid esters, fatty carboxylic acids and/or impurities may be present in the soybean oil, as long as they do not unacceptably affect the lubricating effectiveness of the lubricant. In some embodiments, the lubricant is not limited to a specific fatty acid ester composition of soybean oil.

In certain embodiments, a lubricant of the present disclosure may include from about 30 wt % to about 90 wt %, from about 40 wt % to about 90 wt %, from about 30 wt % to about 80 wt %, from about 40 wt % to about 80 wt %, or from about 40 wt % to about 70 wt % soybean oil. In some embodiments, the lubricant may include greater than or equal to about 30, 35, 40, 45, 50, 55, 60, 65, 70, 75, 80, 85, or 90 weight percent soybean oil. In certain embodiments, the lubricant may include from about 50 wt % to about 80 wt % soybean oil. In certain embodiments, the lubricant may include from about 30 wt % to about 50 wt % soybean oil. In certain embodiments, the lubricant may include about 70 wt % soybean oil. In certain embodiments, the lubricant may include about 40 wt % soybean oil.

The lubricant of the present disclosure may include at least one surfactant. In some embodiments, the surfactant may be a non-ionic surfactant. In some embodiments, the lubricant may include at least two surfactants. In some embodiments, the lubricant may include a blend of at least two surfactants. In certain embodiments, the lubricant may include a blend of at least two nonionic surfactants. In some embodiments, the lubricant may include at least three surfactants. In some embodiments, the lubricant may include a blend of at least three surfactants. In certain embodiments, the lubricant may include a blend of at least three nonionic surfactants.

In some embodiments, a hydrophilic-lipophilic balance (HLB) of the at least one surfactant may be suitable to form a stable phase when combined with the vegetable oil. As used herein, the term "stable phase" refers to a phase that shows minimal or no detectable phase separation and/or coagulation, within the limits of the application. The lubricant of the present disclosure may include an oil soluble surfactant with a low HLB (e.g., an HLB value in the range of from about 1 to about 10). In certain embodiments, the lubricant may include an oil insoluble surfactant with a higher HLB (e.g., an HLB value in the range of from about 10 to about 20). In some embodiments, in absence of a surfactant with a low HLB (e.g., an HLB value in the range of from about 1 to about 10), the oil insoluble surfactant may phase out from a bulk or continuous oil phase including the vegetable oil. In certain embodiments, the oil soluble surfactant and the oil insoluble surfactant may together form a reverse micellar system and stabilize the bulk phase including the vegetable oil.

In certain embodiments, the stable phase is formed when the at least one surfactant (e.g., a non-ionic surfactant) provides an HLB value in the range of from about 1 to about 20, from about 2 to about 20, from about 4 to about 18, from about 4 to about 17, from about 4 to about 12, from about 4 to about 8, from about 10 to about 18, from about 12 to about 18, from about 13 to about 17, from about 12 to about 17, from about 12 to about 16, from about 13 to about 16, from about 12 to about 15, from about 13 to about 15, or from about 14 to about 15. In some embodiments, the vegetable oil may form a stable phase when the at least one surfactant provides an HLB of equal to or about 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, or 18. The at least one surfactant may be selected for an optimum surface activity to create a stable phase with the vegetable oil. In certain embodiments, the at least one surfactant may provide an HLB that is within 1, 2, 3, 4, or 5 of the HLB value suitable to form a stable phase with the vegetable oil.

The lubricant of the present disclosure may include at least one non-ionic surfactant. Suitable non-ionic surfactants may include, but are not limited to, linear alcohol polyethylene oxide ethers, polyethylene glycol (PEG) esters of fatty acids, sorbitan esters, and/or polyethoxylated sorbitan esters, and the like. In some embodiments, the lubricant may include from about 0.5 wt % to about 50 wt %, from about 0.5 wt % to about 40 wt %, from about 0.5 wt % to about 30 wt %, or from about 0.5 wt % to about 20 wt % of at least one non-ionic surfactant. In certain embodiments, the lubricant includes less than or equal to about 50, 40, 30, 20, 10, 5, 1 or 0.5 weight percent of the at least one non-ionic surfactant.

In certain embodiments, a lubricant may include at least one non-ionic surfactant selected from sorbitan esters, and/or derivatives thereof, including, but not limited to, sorbitan monolaurate, sorbitan monopalmitate, sorbitan monostearate, sorbitan monooleate, sorbitan sesquioleate, sorbitan trioleate, sorbitan isostearate, polyethoxylated sorbitan esters, and any combination thereof. In certain embodiments, the lubricant may include from about 0.5 wt % to about 40 wt % of at least one sorbitan ester, and/or derivatives thereof, from about 0.5 wt % to about 30 wt % of at least one sorbitan ester, and/or derivatives thereof, from about 0.5 wt % to about 20 wt % of at least one sorbitan ester, and/or derivatives thereof, from about 1 wt % to about 25 wt % of at least one sorbitan ester, and/or derivatives thereof, from about 1 wt % to about 15 wt % of at least one sorbitan ester, and/or derivatives thereof, from about 1 wt % to about 30 wt % of at least one sorbitan ester, and/or derivatives thereof, from about 1 wt % to about 35 wt % of at least one sorbitan ester, and/or derivatives thereof, or from about 20 wt % to about 30 wt % of at least one sorbitan ester, and/or derivatives thereof. In some embodiments, the lubricant may include about 0.5, 0.8, 1.0, 1.2, 1.4, 1.6, 1.8, 2.0, 2.2, 2.4, 2.6, 2.8, 3.0, 3.2, 3.4, 3.6, 3.8, 4, 5, 6, 7, 8, 9, 10, 12, 14, 16, 18, 20, 22, 24, 26, 28, 30, 32, 34, 36, 38, or 40 weight percent of at least one sorbitan ester, and/or derivatives thereof.

In certain embodiments, the lubricant may include a single sorbitan ester. In some embodiments, the lubricant may include sorbitan monooleate, [(2R)-2-[(2R,3R,4S)-3,4-dihydroxyoxolan-2-yl]-2-hydroxyethyl] (Z)-octadec-9-enoate, otherwise known as Span™ 80 (available from Croda Inc., Plainsboro, N.J.). In embodiments, the lubricant may include at least one sorbitan ester having a molecular weight of less than about 1500, about 1250, about 1000, about 950, about 750, or about 500 Daltons (Da).

In certain embodiments, a lubricant may include at least one non-ionic surfactant selected from sorbitan polyoxyethylene fatty acid esters, including, but not limited to: polyethylene glycol sorbitan monolaurate, polyethylene glycol sorbitan monopalmitate, polyethylene glycol sorbitan monostearate, polyethylene glycol sorbitan tristearate, polyethylene glycol sorbitan monooleate, and any combination thereof. In some embodiments, the non-ionic surfactant may include a sorbitan ester that is polyethoxylated sorbitan monolaurate, polyethoxylated sorbitan monooleate, or a combination thereof. In some embodiments, the non-ionic surfactant may include at least one polyethoxylated sorbitan ester including from about 4 to about 20 moles of ethylene oxide, from about 10 to about 20 moles of ethylene oxide, or from about 10 to about 15 moles of ethylene oxide. In some embodiments, the non-ionic surfactant may include at least one polyethoxylated sorbitan ester including equal to or about 20 moles of ethylene oxide. For example, suitable non-ionic surfactants may include PEG-20 sorbitan monolaurate, PEG-20 sorbitan monopalmitate, PEG-20 sorbitan monostearate, PEG-20 sorbitan tristearate, PEG-20 sorbitan monooleate, and the like.

In some embodiments, the lubricant according to the present disclosure may include a total weight percentage of at least one polyethoxylated sorbitan ester in a range of from about 5 to about 40 wt %, from about 5 to about 30 wt %, from about 10 wt % to about 30 wt %, or from about 15 wt % to about 30 wt % polyethoxylated sorbitan ester. In some embodiments, the lubricant may include a total weight percentage of at least one polyethoxylated sorbitan ester equal to or about 10, 11, 12, 13, 14, 15, 16, 17, 18, 19, 20, 21, 22, 23, 24, 25, 26, 27, 28, 29, 30, 31, 32, 33, 34, or weight percent. In certain embodiments, the lubricant may include one polyethoxylated sorbitan ester. In certain embodiments, the lubricant may include two polyethoxylated sorbitan esters. In certain embodiments, the lubricant may include three or more polyethoxylated sorbitan esters. In some embodiments, the lubricant may include from about 2 wt % to about 30 wt %, from about 5 wt % to about 25 wt %, or from about 2 wt % to about 10 wt % of each of one or more polyethoxylated sorbitan esters.

In some embodiments, the lubricant may include at least one non-ionic surfactant that is sorbitan monooleate (e.g., Span™ 80 (Croda Inc., Plainsboro, N.J.)), polyethoxylated sorbitan monooleate (e.g., Tween® 80 (Croda Americas L.L.C., Switzerland), polyethoxylated sorbitan monolaurate (e.g., Tween® 20 (Croda Americas L.L.C., Switzerland), or any combination thereof. In certain embodiments, the lubricant may include from about 2 wt % to about 5 wt % of sorbitan monooleate, from about 5 wt % to about 12 wt % polyethoxylated sorbitan monooleate and from about 8 wt % to about 13 wt % polyethoxylated sorbitan monolaurate. In certain embodiments, the lubricant may include about 2 wt % of sorbitan monooleate, about 8 wt % polyethoxylated sorbitan monooleate and about 9 wt % polyethoxylated sorbitan monolaurate. In some embodiments, the lubricant may include from about 15 wt % to about 30 wt % of sorbitan monooleate and from about 4 wt % to about 8 wt % polyethoxylated sorbitan monolaurate. In some embodiments, the lubricant may include about 24 wt % sorbitan monooleate and about 6 wt % polyethoxylated sorbitan monolaurate.

The lubricant of the present disclosure may include at least one cosolvent. The cosolvent may include a fatty acid ester cosolvent, a glycerol ester cosolvent, or a combination thereof. In some embodiments, the cosolvent may be a vegetable oil based fatty ester, which may enhance the solubility and stability of the lubricant and impart lubricity. For example, the presence of the cosolvent in the lubricant may improve the stability at high temperatures (e.g., at least up to 300° F. (148.9° C.)) and allow successful use in divalent brine (e.g., without undesirable foaming and/or agglomeration).

In some embodiments, the fatty acid ester cosolvent may include a fatty acid ester. In certain embodiments, the fatty acid ester cosolvent may include a fatty acid ester that includes a simple ester, a fatty ester, an ester that is not a triglyceride, a non-sugar based ester, or any combination thereof. In some embodiments, the fatty acid ester cosolvent may include a derivative obtained from trans-esterification reaction of fatty acid and a small chain alcohol (e.g., a 2-ethyl hexanol). In certain embodiments, the fatty acid ester cosolvent may include PETROFREE® (available from Halliburton Energy Services, Inc.).

In certain embodiments, the glycerol ester cosolvent may include a glycerol ester. The glycerol ester may be an ester formed from glycerol and fatty acids. Examples of glycerol esters that may be suitable for use in the methods and compositions of the present disclosure may include, but are not limited to, 2-ethyl hexyl oleate, glycerol trioleate, glyceryl monooleate, glyceryl monotallate, n-butyl stearate, neopentylglycol dioleate, pentaerythritol monooleate, pentaerythritol tetraoleate, tmp-trioleate, and any combination thereof. In some embodiments, the glycerol ester cosolvent may include a reaction product of a diacid (e.g., azelaic acid) and monohydric or polyhydric alcohol. In some embodiments, the glycerol ester cosolvent may include DEHYLUB® 1037 (bio-lubricant, available from Emery Oleochemicals, Ohio).

In certain embodiments, the lubricant may include from about 1 wt % to about 50 wt % of a cosolvent, from about 5 wt % to about 50 wt % of a cosolvent, from about 5 wt % to about 40 wt % of a cosolvent, from about 10 wt % to about 40 wt % of a cosolvent, from about 10 wt % to about 30 wt % of a cosolvent, or from about 8 wt % to about 15 wt % of a cosolvent. In some embodiments, the lubricant may include about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 weight percent of a cosolvent.

In certain embodiments, the lubricant may include from about 5 wt % to about 20 wt % of a fatty acid ester cosolvent. In certain embodiments, the lubricant may include from about 8 wt % to about 12 wt % of a fatty acid ester cosolvent. In certain embodiments, the lubricant may include about 10 wt % of a fatty acid ester cosolvent.

In certain embodiments, the lubricant may include from about 20 wt % to about 50 wt % of a glycerol ester cosolvent. In certain embodiments, the lubricant may include from about 25 wt % to about 35 wt % of a glycerol ester cosolvent. In certain embodiments, the lubricant may include about 30 wt % of a glycerol ester cosolvent.

A lubricant of the present disclosure may be stable at high temperatures (e.g., capable of maintaining lubricity at least up to 250° F. (121.1° C.), or at least up to 300° F. (148.9° C.)). The lubricant may exhibit stability at cold and surface temperatures, e.g., exhibiting no or reduced precipitation and/or color change, at least between temperatures of between 40° F. (4.4° C.) and 120° F. (48.9° C.), between 0° F. (−17.8° C.) and 120° F. (48.9° C.), between 0° F. (−17.8° C.) and 140° F. (60.0° C.), or between 0° F. (−17.8° C.) and 160° F. (71.1° C.).

In some embodiments, the lubricant may include at least one pour point depressant for cold temperature application. The pour point depressant may be included to improve the flow of the lubricant at lower temperatures, e.g., for temperatures of less than about 40° F. (4.4° C.), 32° F. (0° C.), 30° F. (−1.1° C.), 20° F. (−6.7° C.), 10° F. (−12.2° C.), or 0° F. (−17.8° C.). In some embodiments, the lubricant may include from about 0 wt % to about 10 wt %, from about 0.5 wt % to about 10 wt %, from about 1 wt % to about 10 wt %, from about 1 wt % to about 7 wt %, from about 1 wt % to about 6 wt %, from about 2 wt % to about 7 wt %, or from about 1 wt % to about 5 wt % of at least one pour point depressant. Suitable pour point depressants may include, but are not limited to, glycerine, ethyl ether of ethylene glycol, propyl ether of ethylene glycol, butyl ether of ethylene glycol, diethylene glycol, propylene glycol, polymethacrylates, poly alpha olefins, ethylene glycol, and the like.

The lubricant of the present disclosure may be provided in a treatment fluid. The treatment fluid of the present disclosure may include any base fluid known in the art, including an aqueous fluid, a non-aqueous fluid, an aqueous-miscible fluid, or any combination thereof. As used herein, the term "base fluid" refers to the major component of the fluid (as opposed to components dissolved and/or suspended therein), and does not indicate any particular condition or property of that fluid such as its mass, amount, pH, etc. Suitable base fluids into which the lubricant may be incorporated may include aqueous-based fluid systems, such as brines, water-based muds, and invert emulsion fluid systems, such as water-in-oil emulsions and oil-in-water emulsions.

Aqueous base fluids that may be suitable for use in the methods and compositions of the present disclosure may include water from any source. Such aqueous base fluids may include fresh water, salt water (e.g., water containing one or more salts dissolved therein), brine (e.g., saturated salt water), seawater, and/or any combination thereof. The aqueous base fluids may be from a source that does not contain compounds that adversely affect other components of a fluid. In certain embodiments of the present disclosure, the aqueous base fluids may include one or more ionic species, such as those formed by salts dissolved in water. For example, seawater and/or produced water may include a variety of divalent cationic species dissolved therein.

In certain embodiments, an aqueous base fluid according to the present disclosure may include water with one or more water-soluble salts dissolved therein. In certain embodiments, the one or more salts may include inorganic salts, formate salts, or any combination thereof. Inorganic salts may include monovalent salts, which may be further include alkali metal halides (e.g., sodium chloride), ammonium halides, and any combination thereof. Brines including such monovalent salts may be referred to as "monovalent brines." Inorganic salts may also include divalent salts, such as alkaline earth metal halides (e.g., $CaCl_2$, $CaBr_2$, etc.) and zinc halides. Brines including such divalent salts may be referred to as "divalent brines." Brines including halide-based salts may be referred to as "halide-based brines."

In some embodiments, the aqueous base fluid may include a monovalent brine, a divalent brine, or a combination thereof. Suitable monovalent brines may include, but are not limited to, sodium chloride brines, sodium bromide brines, potassium chloride brines, potassium bromide brines, and the like. Suitable divalent brines may include, but are not limited to, magnesium chloride brines, calcium chloride brines, calcium bromide brines, and the like.

Monovalent salts may be used to prepare treatment fluids, and may have an aqueous phase having a density up to about 12.5 lb/gal (1498 kg/m 3). Divalent salts and formate salts may be used to form drilling or wellbore fluids having an aqueous phase having a density up to about 19.2 lb/gal (2300 kg/m 3). In some embodiments, the one or more inorganic salts may be in a sufficient concentration such that the density of the aqueous phase is in the range of about 9 lb/gal (1078 kg/m$^3$) to about 19.2 lb/gal (2300 kg/m$^3$). In some embodiments according to the present disclosure, the one or more inorganic salts may be selected and in a sufficient concentration such that the density of the aqueous phase is greater than about 9.5 lb/gal (1138 kg/m$^3$). In some embodiments according to the present disclosure, the one or more inorganic salts are selected and in a sufficient concentration such that the density of the aqueous phase is greater than about 13 lb/gal (1558 kg/m$^3$).

In some embodiments, a treatment fluid of the present disclosure may include brine having a density in the range of from about 9 to about 12.5 lbs/gal (pounds per gallon or "ppg") (from about 1078 to about 1498 kg/m 3), from about 9.5 to about 12.5 ppg (from about 1138 to about 1498 kg/m 3), or from about 9 to about 12 ppg (from about 1078 to about 1438 kg/m 3). In some embodiments, a treatment of this disclosure may include a brine having a density of greater than or equal to about 9, 9.5, 10, 10.5, 11, or 11.5 ppg (greater than or equal to about 1078, 1138, 1198, 1258, 1318, or 1378 kg/m 3).

Examples of a non-aqueous base fluid that may be suitable for use as a carrier fluid include, but are not limited to, an oil, a hydrocarbon, an organic liquid, a mineral oil, a synthetic oil, an ester, or any combination thereof. Examples of non-aqueous base fluids suitable for certain embodiments of the present disclosure include, but are not limited to, natural oil based muds (OBM), synthetic based muds (SBM), natural base oils, synthetic base oils and invert emulsions. In certain embodiments, the non-aqueous base fluid may include safra oil. In certain embodiments, the non-aqueous base fluid may include any petroleum oil, natural oil, synthetically derived oil, or combinations thereof. In some embodiments, OBMs and SBMs may include some non-oleaginous fluid such as water, making them water-in-oil type emulsions, also known as invert emulsions wherein a non-oleaginous fluid (e.g. water) includes the internal phase and an oleaginous fluid includes the external phase. The non-oleaginous fluid (e.g. water) may arise in the treatment fluid itself or from the wellbore, or it may be intentionally added to affect the properties of the treatment fluid. Any known non-aqueous fluid may be used to form the external oil phase of the invert emulsion fluid. In certain embodiments, the non-aqueous base fluid does not include a significant amount of water.

Suitable water-in-oil emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or including an aqueous-miscible fluid. In certain embodiments, when a lubricant of the present disclosure is added to an aqueous base fluid, the vegetable oil may form an oil-in-water emulsion as a result of a surfactant with a higher HLB (e.g., an HLB value in the range of from about 10 to about 20) present in the lubricant.

Suitable aqueous-miscible fluids may include, but are not limited to, alcohols (e.g., methanol, ethanol, n-propanol, isopropanol, n-butanol, sec-butanol, isobutanol, and t-butanol; glycerins); glycols (e.g., polyglycols, propylene glycol, and ethylene glycol); polyglycol amines; polyols; any derivative thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any of the above in combination with an aqueous fluid; and any combination thereof.

In certain embodiments, the density of the base fluid may be adjusted, among other purposes, to provide additional particulate transport and suspension in the compositions of the present disclosure. In certain embodiments, the pH of the base fluid may be adjusted (e.g., by a buffer or other pH adjusting agent) to a specific level, which may depend on, among other factors, the types of lubricant, and/or other additives included in the fluid. One of ordinary skill in the art, with the benefit of this disclosure, will recognize when such density and/or pH adjustments are appropriate. In certain embodiments, the treatment fluids may include a mixture of one or more fluids and/or gases, including but not limited to emulsions, foams, and the like.

The lubricant used in accordance with the methods and compositions of the present disclosure may be present in a fluid in an amount sufficient to provide a desired lubricity. In certain embodiments, the lubricant may be present in the fluid in an amount from about 1% to about 20% by weight of the fluid. In certain embodiments, the lubricant may be present in the fluid in an amount from about 0.1% to about 10% by weight of the fluid. In certain embodiments, the lubricant may be present in the fluid in an amount from about 0.5% to about 5% by weight of the fluid. In certain embodiments, the lubricant may be present in the fluid in an amount of about 2% by weight of the fluid. In some embodiments, the lubricant may be present in the fluid in an amount from about 0.5% to about 1.5%, in other embodiments, from about 1.5% to about 2.5%, in other embodiments, from about 2.5% to about 3.5%, in other embodiments, from about 3.5% to about 4.5%, and in other embodiments, from about 4.5% to about 5.5% by weight of the fluid.

A lubricant according to the present disclosure may be effective in treatment fluids containing monovalent brine, divalent brine, and any combination thereof. The lubricant may be stable to high temperatures, maintaining lubricity up to at least 300° F. (148.9° C.), 325° F. (162.8° C.), 350° F. (176.7° C.), or 360° F. (182.2° C.). The lubricant may be stable at cold and surface temperatures, exhibiting no or reduced precipitation and/or color change, at least between temperatures of between 0° F. and 120° F. The lubricant may provide a reduction in the coefficient of friction of a fluid of up to at least 25%, 30%, 35%, 40%, 45%, 50%, 60%, or 70% relative to an untreated fluid, e.g., a treatment fluid absent the lubricant. In certain embodiments, a reference load (e.g., a Falex reference load) of a fluid may be increased at least about 10% relative to an untreated fluid, e.g., a treatment fluid absent the lubricant. The lubricant may provide a foam-suppressing effect, and may exhibit a minimal amount or tendency to foam when added to a treatment fluid, e.g., a divalent brine. In certain embodiments, foaming may be reduced by at least 20%, 30%, 40%, or 50% relative to certain other lubricants.

Treatment fluids of the present disclosure that include a lubricant may exhibit compatibility with high volume percentages of oil contamination. In some embodiments, a treatment fluid of the present disclosure that includes a lubricant may be compatible with at least up to 10, 15, 20, or 25 volume percent oil contamination. In some embodiments, a treatment fluid including a lubricant may be compatible with at least up to 50, 75, or 100 pounds per barrel (ppb) (at least up to 142.5, 213.8, or 285 kg/m$^3$) cuttings contamination.

In some embodiments, the lubricant of the present disclosure may maintain lubricity at loads of at least up to 300 lbs, 400 lbs, 500 lbs, 600 lbs, 700 lbs, 800 lbs, 900 lbs, 1000 lbs, 1100 lbs, 1200 lbs, 1300 lbs, 1400 lbs, 1500 lbs, 1600 lbs, 1700 lbs, 1800 lbs, 1900 lbs, 2000 lbs, 2100 lbs, 2200 lbs, 2220 lbs, 2225 lbs, 2300 lbs, 2400 lbs, or 2500 lbs.

In certain embodiments, the treatment fluids used in accordance with the methods of the present disclosure optionally may include any number of additional additives. Examples of such additional additives include, but are not limited to, salts, additional surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, shale inhibitors, biocides, additional friction reducers, antifoam agents, bridging agents, flocculants, H$_2$S scavengers, CO$_2$ scavengers, oxygen scavengers, lost circulation materials, additional lubricants, additional viscosifiers, breakers, weighting agents, relative permeability modifiers, resins, wetting agents, coating enhancement agents, filter cake removal agents, antifreeze agents (e.g., ethylene glycol or polyethylene glycol), and the like. A person skilled in the art, with the benefit of this disclosure, will recognize the types of additives that may be included in the fluids of the present disclosure for a particular application.

In certain embodiments, the treatment fluids used in accordance with the methods of the present disclosure optionally may include a weighting agent. In some embodiments, the weighting agent may be added to produce a desired density in the treatment fluid. In certain embodiments, the weighting agent may include barite. Examples of other weighting agents include, but are not limited to, hematite, magnetite, iron oxides, illmenite, siderite, celestite, dolomite, olivine, calcite, magnesium oxides, halites, calcium carbonate, strontium sulfate, manganese tetraoxide, and the like. A person skilled in the art, with the benefit of this disclosure, will recognize the types of weighting agent that may be included in the fluids of the present disclosure for a particular application.

In certain embodiments, the treatment fluids including a lubricant optionally may include one or more additional surfactants. The additional surfactant may, among other purposes, help disperse the lubricant and/or other additives in a treatment fluid. Examples of additional surfactants that may be suitable for use may include, but are not limited to, an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

The treatment fluids of the present disclosure may be prepared using any suitable method and/or equipment (e.g., blenders, mixers, stirrers, etc.) known in the art at any time prior to their use. The treatment fluids may be prepared at a well site or at an offsite location.

The present disclosure in some embodiments provides methods for using the treatment fluids to carry out a variety of subterranean treatments or operations, including but not limited to, drilling operations, cementing operations, fracturing operations, gravel packing operations, workover operations, and the like. In some embodiments, the treatment fluids of the present disclosure may be drilling fluids used for drilling a wellbore into a subterranean formation.

In certain embodiments, a treatment fluid including a lubricant may be introduced into a subterranean formation. In certain embodiments, the subterranean formation may have a bottom hole temperature of from about 66° C. (150° F.) to about 204° C. (400° F.). In certain embodiments, the subterranean formation may have a bottom hole temperature of from about 93° C. (200° F.) to about 204° C. (400° F.). In certain embodiments, the subterranean formation may have a bottom hole temperature of from about 93° C. (200° F.) to about 177° C. (350° F.). In certain embodiments, the subterranean formation may have a bottom hole temperature of at least 177° C. (350° F.). In some embodiments, the treatment fluid including the lubricant may be used to drill at least a portion of a wellbore in the subterranean formation. In some embodiments, the treatment fluid may circulate through the wellbore while drilling into the subterranean formation. In some embodiments, the treatment fluid including the lubricant may be introduced into a wellbore that penetrates a subterranean formation.

In some embodiments, the methods of the present disclosure may include foaming the treatment fluid by incorporating air, nitrogen, an appropriate foamer, glass spheres, or any combination thereof into the fluid. In certain embodiments, the treatment fluid may be introduced into the wellbore using one or more pumps. In some embodiments, the lubricant, treatment fluids, and/or additional additives may be used in treating a portion of a subterranean formation, for example, in acidizing treatments such as matrix acidizing or fracture acidizing. In some embodiments, the treatment fluid including the lubricant may be introduced at a pressure sufficient to create or enhance one or more fractures within the subterranean formation (e.g., hydraulic fracturing).

In certain embodiments of the present disclosure, the treatment fluids of the present disclosure may be introduced into a subterranean formation, a wellbore penetrating a subterranean formation, tubing (e.g., pipeline), and/or a container using any method or equipment known in the art. Introduction of the treatment fluids of the present disclosure may in such embodiments include delivery via any of a tube, umbilical, pump, gravity, and combinations thereof. The treatment fluids of the present disclosure may, in various embodiments, be delivered downhole (e.g., into the wellbore) or into top-side flowlines/pipelines or surface treating equipment.

For example, in certain embodiments, the lubricant, treatment fluids, and/or additional additives of the present disclosure may be introduced into a subterranean formation and/or wellbore using batch treatments, squeeze treatments, continuous treatments, and/or combinations thereof. In certain embodiments, a batch treatment may be performed in a subterranean formation by stopping production from the well and pumping a certain amount of the lubricant, treatment fluids, and/or additional additives into a wellbore, which may be performed at one or more points in time during the life of a well. In other embodiments, a squeeze treatment may be performed by dissolving the lubricant, treatment fluids, and/or additional additives in a suitable solvent at a suitable concentration and squeezing that solvent carrying the lubricant or additional additives downhole into the formation, allowing production out of the formation to bring the lubricant and/or additional additives to the desired location.

In some embodiments, the present disclosure provides methods and compositions for using the lubricant, treatment fluids, and/or additional additives to carry out a variety of subterranean treatments, including but not limited to, pre-flush treatments, afterflush treatments, hydraulic fracturing treatments, acidizing treatments, sand control treatments (e.g., gravel packing), "frac-pack" treatments, wellbore clean-out treatments, drilling operations, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like.

In the methods and compositions of the present disclosure, the lubricant may be added to, or included in, a treatment fluid in any amount that may effectively increase the lubricity of a fluid to be treated by a desired amount at a desired temperature. In certain embodiments, an initial amount of lubricant may be added to a treatment fluid followed by subsequent, additional amounts. This technique may be used to increase and/or maintain a concentration of lubricant that may be sufficient to maintain a desired lubricity in a fluid to be treated throughout the course of a given operation.

The treatment fluids of the present disclosure may directly or indirectly affect one or more components or pieces of equipment associated with the preparation, delivery, recapture, recycling, reuse, and/or disposal of the disclosed treatment fluids. For example, and with reference to FIG. 1, the disclosed treatment fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids including a lubricant may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed treatment fluids may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed treatment fluids may be stored, reconditioned, and/or regulated until added to the drilling fluid 122.

As mentioned above, the disclosed treatment fluids may directly or indirectly affect the components and equipment of the drilling assembly 100. For example, the disclosed treatment fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s)

128 may further include one or more sensors, gauges, pumps, compressors, and the like used store, monitor, regulate, and/or recondition the exemplary treatment fluids.

The disclosed treatment fluids may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The disclosed treatment fluids may also directly or indirectly affect the mixing hopper 134 and the retention pit 132 and their assorted variations.

The disclosed treatment fluids may also directly or indirectly affect the various downhole equipment and tools that may come into contact with the treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treatment fluids may also directly or indirectly affect any downhole heat exchangers, valves and corresponding actuation devices, tool seals, packers and other wellbore isolation devices or components, and the like associated with the wellbore 116. The disclosed treatment fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluids may also directly or indirectly affect any transport or delivery equipment used to convey the treatment fluids to the drilling assembly 100 such as, for example, any conduits, pipelines, trucks, tubulars, and/or pipes used to fluidically move the treatment fluids from one location to another, any pumps, compressors, or motors used to drive the treatment fluids into motion, any valves or related joints used to regulate the pressure or flow rate of the treatment fluids, and any sensors (i.e., pressure and temperature), gauges, and/or combinations thereof, and the like.

An embodiment of the present disclosure is a method including introducing a treatment fluid that includes a base fluid and a lubricant including at least one vegetable oil, at least one nonionic surfactant, and at least one cosolvent into at least a portion of a subterranean formation.

Another embodiment of the present disclosure is a composition including a lubricant that includes at least one vegetable oil, at least one nonionic surfactant, and at least one cosolvent.

Another embodiment of the present disclosure is a method including introducing a treatment fluid that includes a divalent brine and a lubricant including at least one vegetable oil, at least one nonionic surfactant, and at least one cosolvent into at least a portion of a subterranean formation; and using the treatment fluid to drill at least a portion of a well bore penetrating at least a portion of the subterranean formation; wherein a coefficient of friction of the treatment fluid is lower than a fluid having a same composition as the treatment fluid but does not include the lubricant.

Another embodiment of the present disclosure is a method including introducing a treatment fluid that includes a base fluid and a lubricant including at least one vegetable oil, at least one nonionic surfactant, and at least one cosolvent into at least a portion of a subterranean formation, wherein a coefficient of friction of the treatment fluid is lower than that of a fluid having a same composition as the treatment fluid but does not include the lubricant. Optionally in this embodiment or any other embodiment disclosed herein, the base fluid includes at least one component selected from the group consisting of: an aqueous fluid, a non-aqueous fluid, an aqueous-miscible fluid, and any combination thereof. Optionally in this embodiment or any other embodiment disclosed herein, the base fluid includes at least one component selected from the group consisting of: a monovalent brine, a divalent brine, and any combination thereof. Optionally in this embodiment or any other embodiment disclosed herein, the base fluid includes a divalent brine. Optionally in this embodiment or any other embodiment disclosed herein, the at least one vegetable oil includes soybean oil. Optionally in this embodiment or any other embodiment disclosed herein, the at least one nonionic surfactant is selected from the group consisting of: sorbitan monooleate, polyethoxylated sorbitan monooleate, polyethoxylated sorbitan monolaurate, and any combination thereof. Optionally in this embodiment or any other embodiment disclosed herein, the at least one cosolvent is selected from the group consisting of: a fatty acid ester cosolvent, a glycerol ester cosolvent, and a combination thereof. Optionally in this embodiment or any other embodiment disclosed herein, the lubricant includes the at least one vegetable oil in an amount from about 30% to about 80% by weight of the lubricant. Optionally in this embodiment or any other embodiment disclosed herein, the lubricant includes the at least one cosolvent in an amount from about 5% to about 50% by weight of the lubricant.

Another embodiment of the present disclosure is a composition including a lubricant that includes at least one vegetable oil, at least one nonionic surfactant, and at least one cosolvent, wherein the composition is a drilling fluid that further includes a divalent brine. Optionally in this embodiment or any other embodiment disclosed herein, the at least one nonionic surfactant is selected from the group consisting of: sorbitan monooleate, polyethoxylated sorbitan monooleate, polyethoxylated sorbitan monolaurate, and any combination thereof. Optionally in this embodiment or any other embodiment disclosed herein, the at least one cosolvent is selected from the group consisting of: a fatty acid ester cosolvent, a glycerol ester cosolvent, and a combination thereof. Optionally in this embodiment or any other embodiment disclosed herein, the at least one vegetable oil includes soybean oil, the at least one nonionic surfactant includes sorbitan monooleate, polyethoxylated sorbitan monooleate and polyethoxylated sorbitan monolaurate, and the at least one cosolvent includes a fatty acid ester. Optionally in this embodiment or any other embodiment disclosed herein, the at least one vegetable oil includes soybean oil, the at least one nonionic surfactant includes sorbitan monooleate and polyethoxylated sorbitan monolaurate, and the at least one cosolvent includes a glycerol ester.

Another embodiment of the present disclosure is a method including introducing a treatment fluid that includes a divalent brine and a lubricant including at least one vegetable oil, at least one nonionic surfactant, and at least one cosolvent into at least a portion of a subterranean formation; and using the treatment fluid to drill at least a portion of a well bore penetrating at least a portion of the subterranean formation; wherein a coefficient of friction of the treatment fluid is lower than a fluid having a same composition as the treatment fluid but does not include the lubricant, wherein the at least one vegetable oil includes soybean oil. Optionally in this embodiment or any other embodiment disclosed herein, the at least one nonionic surfactant is selected from the group consisting of: sorbitan monooleate, polyethoxylated sorbitan monooleate, polyethoxylated sorbitan monolaurate, and any combination thereof. Optionally in this embodiment or any other embodiment disclosed herein, the at least one cosolvent is selected from the group consisting of: a fatty acid ester cosolvent, a glycerol ester cosolvent, and a combination thereof.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

The following examples demonstrate compositions of lubricants and laboratory tests conducted to evaluate the ability of the lubricant to provide lubricity according to some embodiments of the present disclosure. Percentages set forth in the Examples are weight percentages except as otherwise indicated. Lubricities (measured as coefficients of friction; CoF) were determined utilizing a standard Falex lubricity meter (available from Faville-Le Valley Corporation of Bellwood, Ill.). The Falex apparatus measures torque at increasing reference loads (from about 300 to 3000 lbs reference load), which are applied to a Pin and Vee block assembly during prescribed time intervals.

Example 1

This example describes exemplary compositions of lubricants. Components varied as indicated in Table 1 for exemplary lubricant compositions 1 and 2.

TABLE 1

Exemplary compositions of lubricants

| Component | Composition 1 wt % | Composition 2 wt % |
|---|---|---|
| Vegetable oil | 50-80 | 30-50 |
| Sorbitan esters (nonionic surfactant) | 1-30 | 1-35 |
| Fatty acid ester cosolvent | 5-20 | 0 |
| Glycerol ester cosolvent | 0 | 20-50 |

Compositions 1 and 2 were prepared by combining the components indicated in Table 1 followed by high shear mixing at ambient temperature for 30 minutes. The specific gravity of composition 1 was measured to be 0.94 g/ml and the specific gravity of composition 2 was measured to be 0.95 g/ml.

The stability of lubricant compositions 1 and 2 in solutions of monovalent brines (1.4 w % NaCl and 10 w % KCl) and divalent brines (10 w % $CaCl_2$ or 25 w % $CaCl_2$) was compared to that of BaraLube™ W-933 (available from Halliburton Energy Services, Inc.). BaraLube™ W-933 is a lubricant developed for water-based fluids that includes a vegetable oil and a mixture of non-ionic surfactants.

2% wt % of composition 1, composition 2, or BaraLube™ W-933 was added to a solution of 1.4 w % NaCl, 10 w % KCl, 10% $CaCl_2$ or 25% $CaCl_2$. The mixtures were hot rolled at 250° F. (121.1° C.). No cheesing or greasing was observed for composition 1 or composition 2 in either monovalent or divalent brines after hot rolling. While no cheesing or greasing was observed for BaraLube™ W-933 in monovalent brines (1.4 w % NaCl and 10 w % KCl), significant cheesing was observed for BaraLube™ W-933 in divalent brines (10 w % $CaCl_2$ or 25 w % $CaCl_2$) after hot rolling. These results demonstrate, inter alia, the improved stability of the lubricants of the present disclosure in divalent brines.

Example 2

This example describes the lubricity performance in monovalent brine of the lubricant of composition 1 compared to BaraLube™ W-933 (available from Halliburton Energy Services, Inc.).

Falex coefficients of friction (CoF) were determined for various reference loads with 2 weight percent lubricants in a monovalent brine system (1.4 w % NaCl), after hot rolling (AHR) at 250° F. (121.1° C.) for 16 hours. The results of these measurements are shown in FIG. 2. FIG. 2 demonstrates about an 75-80% reduction in torque for the lubricant of composition 1 and BaraLube™ W-933 in monovalent brine for loads up to 2225 lbs. These results demonstrate, inter alia, the stability of the lubricants of the present disclosure in monovalent brines.

Example 3

This example describes the lubricity performance in divalent brine of the lubricant of composition 1. As BaraLube™ W-933 cheeses out in divalent brine, its lubricity in divalent brine could not be measured.

Falex coefficients of friction (CoF) were determined for various reference loads with 2 weight percent lubricant of composition 1 in divalent brine systems of 10 w % $CaCl_2$ and 25 w % $CaCl_2$ after hot rolling (AHR) at 250° F. (121.1° C.) for 16 hours. The results of these measurements are shown in FIG. 3. FIG. 3 demonstrates about an 75-80% reduction in torque for the lubricant of composition 1 in divalent brines for loads up to 2220 lbs. These results demonstrate, inter alia, the stability of the lubricants of the present disclosure in divalent brines.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
introducing a treatment fluid comprising a base fluid and a lubricant comprising at least one vegetable oil, at least one nonionic surfactant, and at least one cosolvent into at least a portion of a wellbore penetrating a subterranean formation, wherein the base fluid comprises at least one component selected from the group consisting of: a monovalent brine, a divalent brine, and any combination thereof and wherein the treatment fluid maintains lubricity at equal to or greater than 250° F.

2. The method of claim 1, wherein a coefficient of friction of the treatment fluid is lower than that of a fluid having a same composition as the treatment fluid but does not comprise the lubricant.

3. The method of claim 1, wherein the base fluid comprises a divalent brine.

4. The method of claim 1, wherein the at least one vegetable oil comprises soybean oil.

5. The method of claim 1, wherein the at least one nonionic surfactant is selected from the group consisting of: sorbitan monooleate, polyethoxylated sorbitan monooleate, polyethoxylated sorbitan monolaurate, and any combination thereof.

6. The method of claim 1, wherein the at least one cosolvent is selected from the group consisting of: a fatty acid ester cosolvent, a glycerol ester cosolvent, and a combination thereof.

7. The method of claim 1, wherein the lubricant comprises the at least one vegetable oil in an amount from about 30% to about 80% by weight of the lubricant.

8. The method of claim 1, wherein the lubricant comprises the at least one cosolvent in an amount from about 5% to about 50% by weight of the lubricant.

9. The method of claim 1, wherein the treatment fluid is a drilling fluid that further comprises a divalent brine.

10. The method of claim 9, wherein the at least one nonionic surfactant is selected from the group consisting of: sorbitan monooleate, polyethoxylated sorbitan monooleate, polyethoxylated sorbitan monolaurate, and any combination thereof.

11. The method of claim 10, wherein the at least one cosolvent is selected from the group consisting of: a fatty acid ester cosolvent, a glycerol ester cosolvent, and a combination thereof.

12. The method of claim 11, wherein the treatment fluid maintains lubricity at equal to or greater than 300° F.

13. The method of claim 1, wherein the at least one vegetable oil comprises soybean oil, the at least one nonionic surfactant comprises sorbitan monooleate, polyethoxylated sorbitan monooleate and polyethoxylated sorbitan monolaurate, and the at least one cosolvent comprises a fatty acid ester.

14. The method of claim 1, wherein the at least one vegetable oil comprises soybean oil, the at least one nonionic surfactant comprises sorbitan monooleate and polyethoxylated sorbitan monolaurate, and the at least one cosolvent comprises a glycerol ester.

15. A method comprising:
introducing a treatment fluid comprising a divalent brine and a lubricant comprising at least one vegetable oil, at least one nonionic surfactant, and at least one cosolvent into at least a portion of a wellbore penetrating a subterranean formation; and using the treatment fluid to drill at least a portion of the wellbore;

wherein the base fluid comprises at least one component selected from the group consisting of: a monovalent brine, a divalent brine, and any combination thereof and wherein the treatment fluid maintains lubricity at equal to or greater than 250° F.

16. The method of claim 15, wherein the at least one vegetable oil comprises soybean oil.

17. The method of claim 15, wherein the at least one nonionic surfactant is selected from the group consisting of: sorbitan monooleate, polyethoxylated sorbitan monooleate, polyethoxylated sorbitan monolaurate, and any combination thereof.

18. The method of claim 15, wherein the at least one cosolvent is selected from the group consisting of: a fatty acid ester cosolvent, a glycerol ester cosolvent, and a combination thereof.

19. The method of claim 16, wherein the at least one nonionic surfactant is selected from the group consisting of: sorbitan monooleate, polyethoxylated sorbitan monooleate, polyethoxylated sorbitan monolaurate, and any combination thereof.

20. The method of claim 16, wherein the at least one cosolvent is selected from the group consisting of: a fatty acid ester cosolvent, a glycerol ester cosolvent, and a combination thereof.

21. The method of claim 19, wherein the at least one cosolvent is selected from the group consisting of: a fatty acid ester cosolvent, a glycerol ester cosolvent, and a combination thereof.

22. The method of claim 16, wherein the at least one vegetable oil comprises soybean oil, the at least one nonionic surfactant comprises sorbitan monooleate, polyethoxylated sorbitan monooleate and polyethoxylated sorbitan monolaurate, and the at least one cosolvent comprises a fatty acid ester.

23. The method of claim 16, wherein the at least one vegetable oil comprises soybean oil, the at least one nonionic surfactant comprises sorbitan monooleate and polyethoxylated sorbitan monolaurate, and the at least one cosolvent comprises a glycerol ester.

24. The method of claim 21, wherein the treatment fluid maintains lubricity at equal to or greater than 300° F.

* * * * *